June 9, 1925. 1,541,439

C. R. SHORT ET AL

FRONT SPRING

Filed May 23, 1921

Witnesses:

Inventors:
Charles R. Short
and Roscoe N. Hart
By their Attorney:
Francis D. Hardesty Patented June 9, 1925.

1,541,439

UNITED STATES PATENT OFFICE.

CHARLES R. SHORT AND ROSCOE N. HART, OF DAYTON, OHIO, ASSIGNORS TO GENERAL MOTORS RESEARCH CORPORATION, OF DAYTON, OHIO, A CORPORATION OF DELAWARE.

FRONT SPRING.

Application filed May 23, 1921. Serial No. 471,768.

*To all whom it may concern:*

Be it known that we, CHARLES R. SHORT, a subject of the King of Great Britain, and ROSCOE N. HART, a citizen of the United States of America, residing at Dayton, county of Montgomery, and State of Ohio, have invented certain new and useful Improvements in Front Springs, of which the following is a full, clear, and exact description.

The invention relates to vehicle springs, and especially to springs of the type suitable for use in supporting the front end of a motor vehicle frame from the front axle, and has for its principal object the provision of improved spring supporting and attaching means adapted to connect a flat or quarter-elliptic spring to the vehicle frame and axle.

Further objects and advantages will appear from the following description taken with the accompanying drawings illustrating one embodiment of our invention, and in which—

Figure 1:
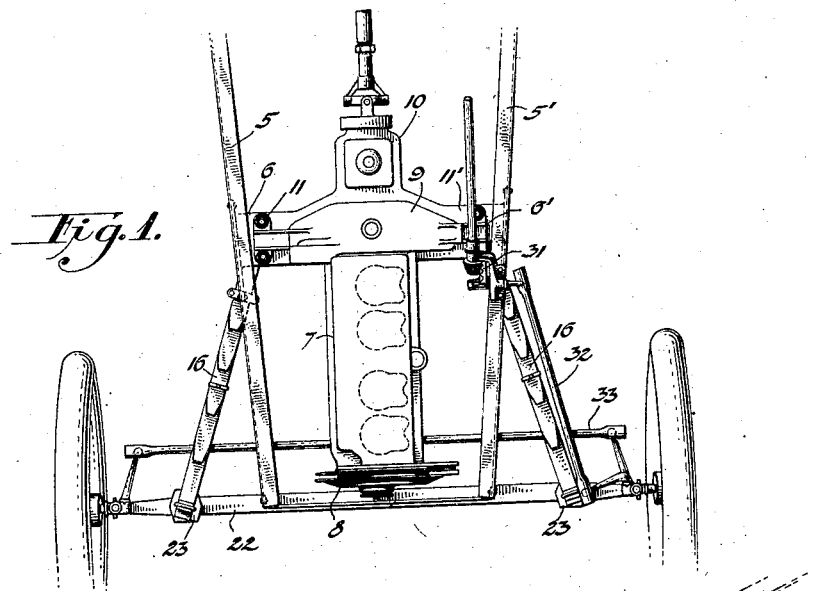
Fig. 1 is a plan view of the forward end of a motor vehicle chassis.
Figure 2:
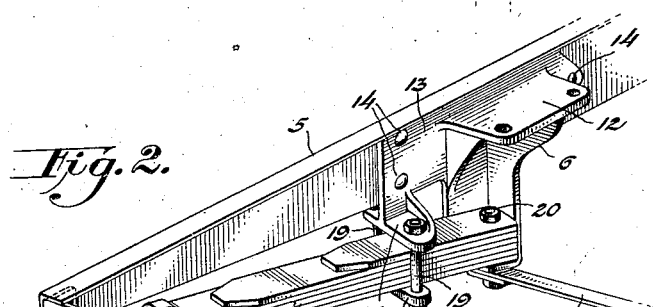
Fig. 2 is a perspective view of a portion of the chassis on an enlarged scale.
Figure 3:
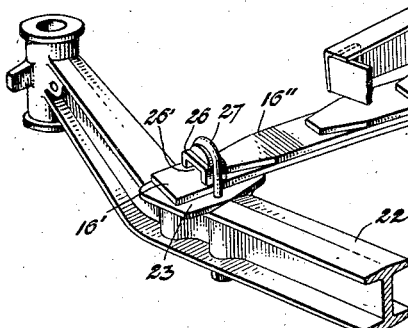
Fig. 3 is a perspective view of a spring bracket.
Figure 4:
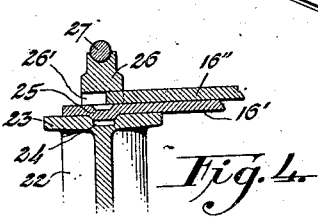
Fig. 4 is a vertical section through a portion of the spring and vehicle axle.

Referring to the drawings, the vehicle chassis shown includes longitudinal side frame members 5, 5', which are preferably bars of angle iron, the web of the bar being positioned vertically and a flange being located at the top of the web and inwardly directed. While other commercial forms of profile iron or special designs may be used if desired, the form illustrated is preferred for a light chassis because of its cheapness and ease of fabrication and assembly.

Spring brackets 6, 6', are mounted upon the side members, preferably upon the inner sides of the webs, whereby the bracket may serve as part of the front transverse frame member and also as a support for the engine 7. The engine is shown as of the air-cooled internal combustion type, having a fan 8, a flywheel and clutch casing 9, and a transmission casing 10, but the specific character or details of the engine are not essential to an understanding of the present invention and form no part thereof. As illustrated, the engine frame or casing constitutes a part of the front transverse vehicle frame, the flywheel casing being provided with flanges 11, 11', which seat upon ledges, as shown at 12, and are rigidly bolted thereto. The construction whereby the engine frame and spring brackets together constitute the front cross member of the chassis frame is not claimed, however, in this application, the same being included in the subject matter of an application of Charles F. Kettering, Serial No. 472,225, filed May 24, 1921.

The spring brackets 6, 6', are counterparts, being related to each other as "rights" and "lefts." The specific description will therefore be confined to one bracket, the one illustrated in detail being the bracket adapted to be mounted upon the right-hand frame member 5. This bracket, which may be cast in one piece, comprises a vertically disposed plate or body portion 13 provided with apertures whereby it may be secured to the web of the member 5 as by rivets 14. Additional means may be provided, if desired, to take the strain from the rivets, which means may include lugs struck inwardly from the frame member with which portions of the bracket engage, the bracket being bored or otherwise shaped to fit against or around such lugs. Extending inwardly from the plate portion 13 is the ledge 12 hereinbefore mentioned and below the ledge 12, on the inner side of the bracket, is a spring seat 15 adapted to receive the rear or fixed end of a substantially flat or quarter-elliptic laminated or leaf spring 16. A flange 15' extends from the seat 15 to the ledge 12, serving to reinforce both the seat and ledge and providing, with the vertically extending body portion 13, a recess the walls of which act as abutments on the side and end of the spring. Near the forward end of the body or plate portion 13 is the abutment member 17 against the lower side of which the spring engages and to which it is secured in any suitable manner, as by a cross bar 18 and bolts 19 passing through apertures in the bar and abutment member respectively. The rear end of the spring is secured fixedly to the seat 15 as by bolt 20 passing through apertures in the spring leaves and aperture 21 in the seat member.

The front axle 22 is formed with spring seats or pads 23, adapted to receive the lower leaf 16' of the spring. A depression 24 is provided in the surface of the pad to receive the lug or projection 25 stamped or otherwise formed upon the lower side of the spring leaf 16', by which means relative lateral displacement of the spring and pad may be prevented. An arch or bridge member 26 is seated upon the spring leaf 16' and a U-bolt 27 lying in a curved groove in the arch member and passing through holes in the axle serves to clamp the arch member to the spring leaf and the latter to the pad. A recess 26' on the lower side of the bridge member 26 provides a space into which the second leaf 16" of the spring may slide when deflection takes place under load, the said leaf being narrowed slightly at the end to correspond with the width of the recess.

It may be considered advisable in some instances to brace the spring brackets by connecting the lower portions of the two, as by the cross bar 30 which may be secured at its ends to the brackets by bolts 20. This brace will serve to relieve the brackets from some of the strain due to the bending action of the springs and to the twisting action under deflection referred to below. Suitable steering gear 31 will be provided, connected by drag links 32, 33, to steering arms on the wheel spindles in the usual manner, the drag link 32 being arranged as shown in approximate parallelism with the adjacent spring in order to obviate oscillation of the dirigible wheels by reason of vertical movement of the vehicle frame and body.

It will be noted that the location of the spring brackets upon the inner sides of the side frame members and providing the spring seat on the inner side of the bracket increases the angle of divergence of the springs toward their points of attachment to the front axle, thus resulting in considerable twisting or torsional effect when the springs are deflected. In accordance with the well known principles of operation of springs, this action offers an advantage in that it produces a damping effect due to the rapidly increasing rate of resistance to torsional distortion. The spring bracket and associated attaching means as described provides a strong and rigid support for the fixed end of the spring, end thrust due to road shocks being taken by the abutment 15', downward pressure by the seat 15 and upward pressure by the abutment 17. The means for attachment to the front axle is also simple and highly efficient in preventing relative displacement while permitting free spring action.

The spring has been referred to herein as of the quarter-elliptic type, but it will be understood that, when under normal load, the spring may become substantially flat. The particular curvature, however, is not a feature of the invention and may vary within reasonable limits. Various other changes in details of construction and proportions of parts may be made without departing from the spirit and scope of the invention and therefore it is not desired that the invention be limited to the specific structure described.

We claim:

1. A spring bracket comprising a body portion adapted to be secured to a vertical web of a vehicle frame member, a pad or abutment for the upper side of a spring directly under said body portion, and a seat depending below said body portion and on the inner side thereof adapted to receive an end of a quarter-elliptic spring.

2. A spring bracket comprising a body portion adapted to be secured to a vertical web of a vehicle frame member, a pad or abutment for the upper side of a spring directly under said body portion, a seat depending below said body portion and on the inner side thereof, and adapted to receive an end of a quarter-elliptic spring, and an abutment for taking end thrust on said spring.

3. A spring bracket comprising in one piece a vertical web or body portion, a laterally and inwardly extending ledge forming a spring seat, a vertical inwardly extending flange joined to said ledge, a top spring abutment directly under said web, and an inwardly extending ledge for supporting an engine frame.

4. The combination of a chassis frame member having a vertical web and a front spring bracket comprising a vertical web or body portion secured to the inner side of the web of said frame member, an inwardly extending spring seat, and a top spring abutment directly under said web, said parts constructed and arranged to receive the end of a quarter-elliptic spring and permit the spring to extend outwardly and forwardly beneath the said frame member.

5. The combination of a chassis frame member and a front axle having a spring seat, a spring bracket secured to the inner side of said member, a leaf spring secured at one end to said bracket and at the other end to said spring seat, said spring and seat having inter-fitting parts to prevent relative displacement laterally.

6. In combination with a vehicle axle having a spring seat, and a multiple leaf spring the lower leaf of which rests upon said seat; interengaging elements on said lower leaf and said spring seat for preventing relative displacement of said parts; and securing means for holding said lower leaf upon said spring seat and said interengaging elements in engagement with one another, said securing means including a bridge piece resting upon said lower leaf, and having a recess in which the end of a second leaf of the spring may slide freely.

In testimony whereof we hereto affix our signatures.

CHARLES R. SHORT.
ROSCOE N. HART.

Witnesses:
R. K. LEE,
A. C. LEHMAN.